US007871257B2

(12) United States Patent
Maruyama et al.

(10) Patent No.: US 7,871,257 B2
(45) Date of Patent: Jan. 18, 2011

(54) INJECTION MOLDING MACHINE

(75) Inventors: Junpei Maruyama, Yamanashi (JP);
Tatsuhiro Uchiyama, Yamanashi (JP);
Satoshi Takatsugi, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 214 days.

(21) Appl. No.: 11/967,583

(22) Filed: Dec. 31, 2007

(65) Prior Publication Data
US 2008/0199551 A1 Aug. 21, 2008

(30) Foreign Application Priority Data
Feb. 15, 2007 (JP) ............................. 2007-035172

(51) Int. Cl.
*B29C 45/52* (2006.01)
*B29C 45/76* (2006.01)
(52) U.S. Cl. .................. 425/145; 425/559; 425/587
(58) Field of Classification Search .................. 425/135, 425/145, 169, 559, 563, 587
See application file for complete search history.

(56) References Cited

U.S. PATENT DOCUMENTS

| 7,074,028 | B2 | 7/2006 | Watanabe et al. | |
|---|---|---|---|---|
| 7,556,753 | B2 * | 7/2009 | Uchiyama et al. | ........ 264/40.1 |
| 2004/0139810 | A1 | 7/2004 | Saito et al. | |
| 2006/0278014 | A1 | 12/2006 | Okada et al. | |

FOREIGN PATENT DOCUMENTS

| EP | 0349649 | A1 | 1/1990 |
|---|---|---|---|
| JP | 04-053720 | A | 2/1992 |
| JP | 04-201225 | A | 7/1992 |
| JP | 2004-216808 | A | 8/2004 |
| JP | 2006-247874 | A | 9/2006 |

OTHER PUBLICATIONS

EP Search Report for EP07124097.2 dated May 8, 2008.

* cited by examiner

*Primary Examiner*—Yogendra N Gupta
*Assistant Examiner*—Joseph Leyson
(74) *Attorney, Agent, or Firm*—Lowe, Hauptman, Ham & Berner, LLP

(57) ABSTRACT

An injection molding machine capable of accurately detecting a rotational force exerted on a screw by resin backflow to easily evaluate states of resin backflow and closure of a check valve. In a state where the screw is stopped axially and rotationally after metering is finished, a load exerted on the screw in the rotational direction is detected. This load is a rotational force exerted on the screw from resin remaining between flights of the screw (resistance torque component). During injection, a load T exerted on the screw in the direction of rotation is detected, and the resistance torque component is subtracted from the detected load T to obtain a backflow torque component generated by resin flowing back through the check valve. By simultaneously displaying waveforms of backflow torque components in a plurality of molding cycles to be overlapped, stability of closure of the check valve is readily evaluated.

4 Claims, 4 Drawing Sheets

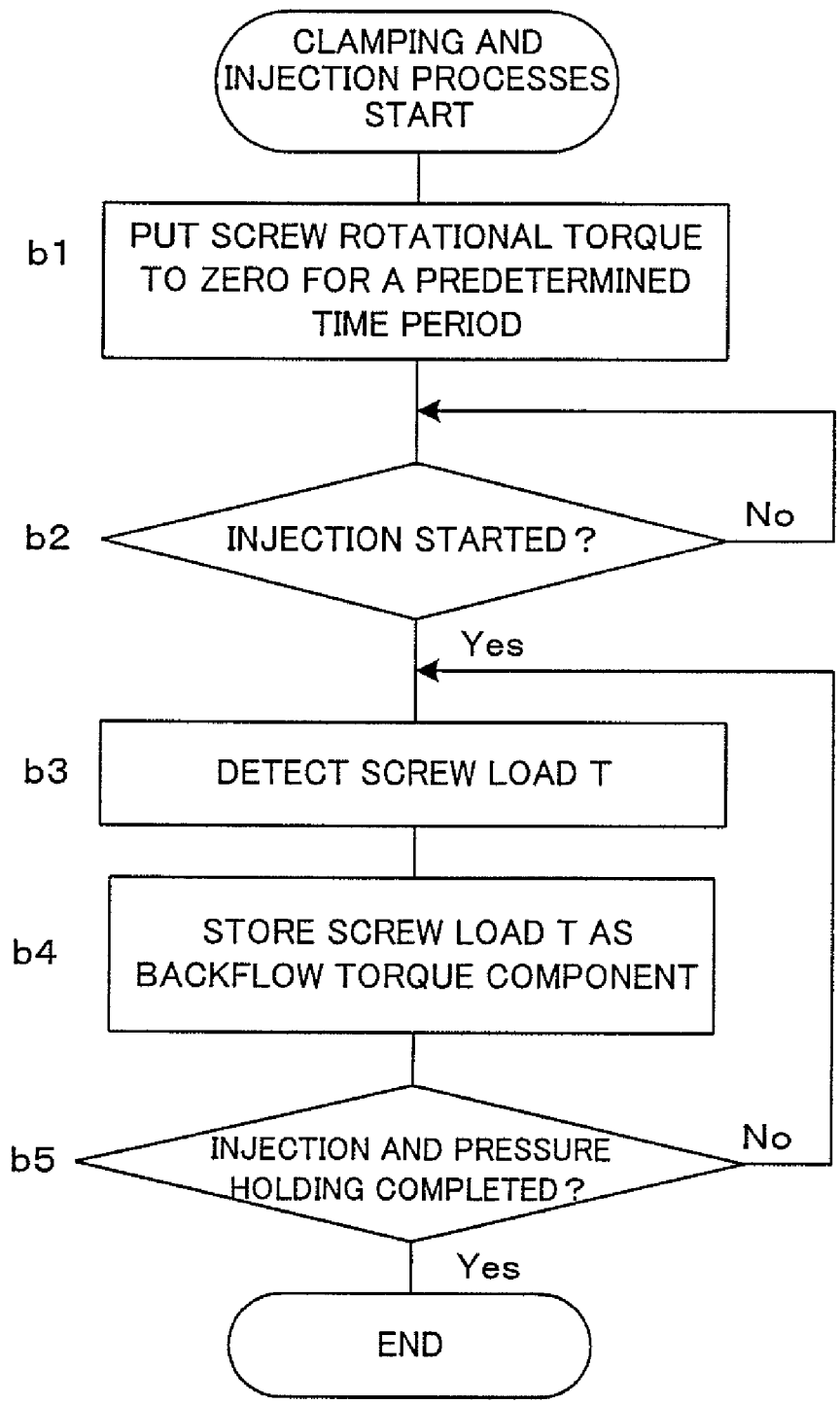

INJECTION MOLDING MACHINE

RELATED APPLICATIONS

The present application is based on, and claims priority from Japanese Application No. 2007-035172 filed Feb. 15, 2007, the disclosure of which is hereby incorporated by reference herein in its entirety.

BACKGROUND OF THE INVENTION

1. Field of the Invention

The present invention relates to an injection molding machine having a check valve at a distal end portion of a screw, and more particularly to an injection molding machine that accurately detects backflow of resin as well as closing of the check valve when the screw is advanced.

2. Description of Related Art

In an injection molding machine provided with a check valve on a tip of a screw, in a case in which when metering is finished the check valve is open and in this state injection is carried out, a resin backflow occurs. As a result, any fluctuation in the timing of the closing of the check ring 3 causes a change in injection volume at each molding cycle, which affects the quality of the molded article.

FIG. 1 shows an example of the check valve. A check ring 3 capable of moving in the axial direction of a screw 1 is provided on a tip of the screw 1, at a portion of reduced diameter provided between a screw head 2 mounted on the tip of the screw 1 and body of the screw 1, and a check seat 4 that contacts and closely adheres to the check ring 3 to close a resin flow channel is provided on a screw 1 body side of the portion of reduced diameter. Resin pellets supplied from the rear of the screw 1 are supplied to the interior of a barrel 7 and are melted by shear heat generated by rotation of the screw 1 during metering and by heat from a heater provided on the outside of the barrel 7 in which the screw 1 is inserted. The melted resin causes the resin pressure behind the check ring 3 to increase, generating a force that pushes the check ring 3 forward. As the check ring 3 is pushed forward, resin at the rear passes through a gap between the check ring 3 and the portion of reduced diameter and flows in front of the check ring 3, increasing the pressure inside the barrel 7 in front of the screw head 2.

When the pressure in front of the check ring 3 exceeds a predetermined pressure (back pressure), the screw 1 is pushed back and the pressure in front of the check ring 3 is reduced. As the screw 1 rotates further the pressure behind the check ring 3 becomes higher than the pressure in front of the check ring 3, and the melted resin continues to flow to the front of the check ring 3. When the screw 1 retreats a predetermined amount, screw rotation is stopped, ending metering.

Next is the injection process, in which, as the screw 1 advances to fill a mold with the resin, the resin pressure building ahead of the screw head 2 increases, causing the check ring 3 to retreat and adhere closely to the check seat 4, closing the resin flow channel and preventing the melted resin from flowing backward (back-flowing) in the direction of retreat of the screw 1. The timing of the closing of the check valve fluctuates depending on the magnitude of the resin pressure in front of the check valve and the magnitude of the resin pressure behind the check valve when injection begins. From the start of injection to the closing of the check valve there occurs a backflow of resin from the front of the check valve toward the rear, which causes the timing of the closing of the check valve to fluctuate, which in turn causes the volume of injection at each molding cycle to fluctuate, affecting the quality of the molded article.

Accordingly, various methods have been proposed to detect the timing of the closing of the check valve, judging the quality of the molded article, and adjusting molding conditions.

For example, a method is known in which a pressure sensor is provided that detects the resin pressure inside the barrel at a position to the rear of the check valve, and detects the closing of the check valve based on changes in pressure detected by the pressure sensor (e.g., JP04-53720A and JP04-201225A). In addition, a method of advancing the screw as it rotates freely at the start of injection, allowing the backflow of resin to rotate the screw in reverse, and detecting a position at which this reverse rotation stops (e.g. JP2004-216808A) is also known.

Further, a method of displaying physical quantities relating to the molding operation as changing waveforms on a display, monitoring the injection molding operation, and detecting molding irregularities is also well known. Thus, for example, a method of detecting injection pressure waveforms in the injection process and superimposing multiple such pressure waveforms in an overlapping display to facilitate detection of irregularities is also known. In such overlapping display, reference points are set and the points at which the detected pressure waveforms pass the reference points are allowed to coincide with each other to provide the overlapping display and facilitate comparison of the waveforms (JP2006-247874A).

The amount of backflow of resin during injection affects the volume (weight) of resin that fills the interior of the mold, and therefore it is preferable that the backflow amount be constant at each of the molding cycles. Accordingly, the conventional art described above uses the resin backflow amount as a benchmark to detect the timing of the closing of the check valve and carry out determination of the backflow amount, judgment of the quality of the molded article, and adjustment of the molding conditions.

In addition, the molding states of the molding cycles can be detected and the quality of the molded article can be judged by detecting physical quantities associated with the molding operation, such as injection pressure in the injection process, and providing an overlapping display of waveforms of changes in these physical quantities as described in JP2006-247874A. However, detecting the injection pressure at each cycle and providing an overlapping display of the detected injection pressure waveforms in order to determine if the resin backflow amount and the timing of the closing of the check valve themselves are reliably constant so as to be able to detect irregularities is difficult.

The reason is this: Although in a typical injection molding machine a pressure sensor for detecting the injection pressure is provided to the rear of the screw (that is, to the right of the screw in FIG. 1), what is detected by this sensor is pressure exerted on the screw in the axial direction of the screw, and therefore it is difficult to detect a force in the axial direction exerted by the back-flowing resin on the flights of the screw by the resin pressure in front of the screw head. Consequently, it is difficult to detect accurately the resin backflow state from the detected injection pressure.

SUMMARY OF THE INVENTION

The present invention provides an injection molding machine that is capable of detecting more accurately a state of resin backflow as a screw advances, and further, provides an injection molding machine capable of evaluating stability of closure of a check valve and a molding state on the basis of the state of the resin backflow.

An injection molding machine of the present invention has a screw provided with a check valve, rotational drive means for driving the screw rotationally for metering of resin, axial drive means for driving the screw axially for injection of resin and rotational force detecting means for detecting a rotational force exerted on the screw. According to one aspect of the present invention, the injection molding machine comprises: storing means that stores a rotational force detected by the rotational force detecting means in a state in which the screw is stopped axially and rotationally after the metering of resin is completed; and determining means that determines a rotational force exerted on the screw by backflow of resin through the check valve based on a rotational force detected by the rotational force detecting means while the screw is axially driven by the axial driving means and the rotational force stored by the storing means.

According to another aspect of the present invention, the injection molding machine comprises: means that puts the screw into a state in which the screw rotates freely for a predetermined time period before the screw is driven in the axial direction by the axial driving means after the metering of resin is completed; and determining means that determines a rotational force detected by the rotational force detecting means as a rotational force exerted on the screw by backflow of resin while the screw is driven in the axial direction by the axial drive means.

The injection molding machine may further comprise display means that simultaneously displays a plurality of waveforms of rotational forces exerted on the screw by the backflow of resin, which have been determined by the determining means in a plurality of molding cycles, to be overlapped one another. With this arrangement, states of backflow of resin and closing of the check valve in respective molding cycles are readily compared and analyzed.

From the screw rotational force detected during the axial motion of the screw such as in the injection the effect of the torque exerted on the screw from the resin in the grooves between the flights of the screw can be removed, enabling just the torque generated by the backflow of resin to be detected accurately. In addition, when simultaneously displaying multiple waveforms representing the torque generated by the backflow of resin detected at each molding cycle the fluctuations in the torque exerted on the screw from the resin in the grooves between the flights of the screw is removed, thus facilitating ready comparison of the waveforms and enabling the reliability of the check valve closure to be evaluated based on the degree to which the waveforms overlap (coincide).

BRIEF DESCRIPTION OF THE DRAWINGS

FIG. 6 is a flow chart illustrating an algorithm of a process of detecting a backflow torque component implemented by a controller of a second embodiment of the present invention.

DETAILED DESCRIPTION

In order to facilitate an understanding the present invention, a description is first given of the basic principle on which the present invention is based.

Figure 1:
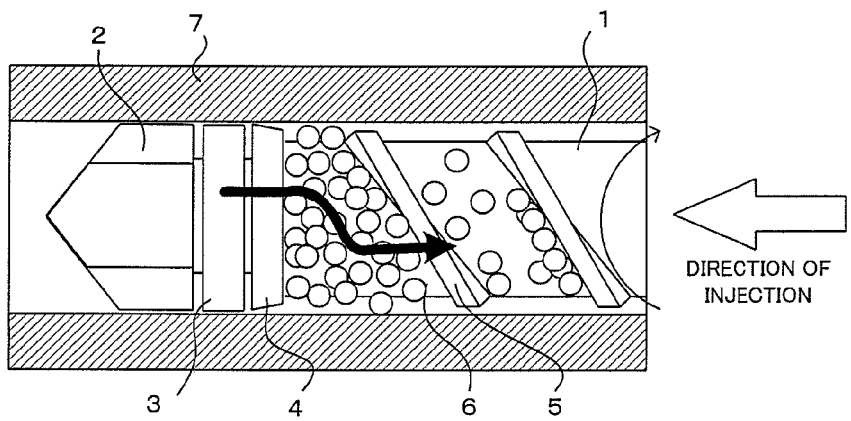
FIG. 1 is a diagram illustrating a check valve provided on a tip of a screw and backflow of resin occurring during injection.
Figure 2:
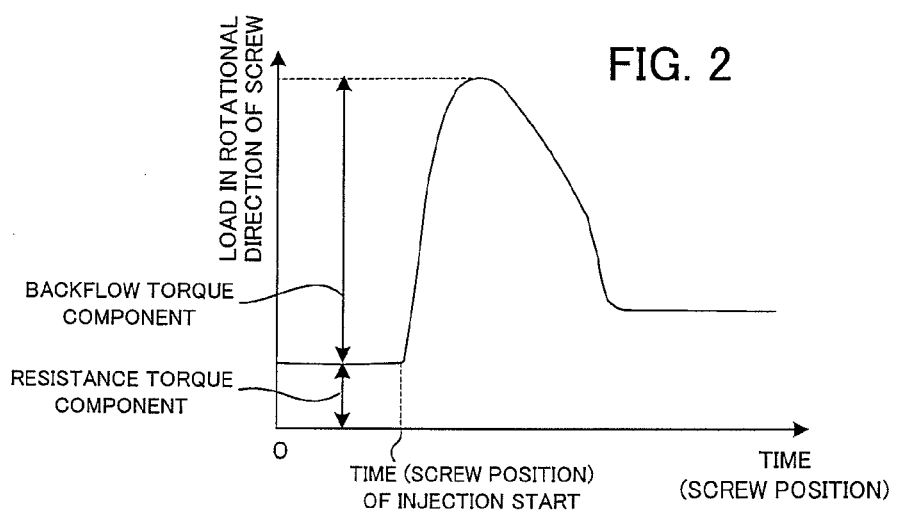
FIG. 2 is a diagram illustrating a load (screw load) in a direction of rotation of the screw within a certain time period after start of injection, from a state just prior to the start of injection and after metering is finished.

FIG. 2 is a diagram illustrating a load (rotational force) exerted on the screw in the direction of rotation of the screw within a certain time period after start of injection, from a state just prior to the start of injection after metering is finished. In every molding cycle of the injection molding machine, after metering is finished but before the start of injection, movement of the screw in the axial direction and rotation of the screw are stopped, and in that state the screw rotation angle is held. At this time, flights 5, which are the plasticizing portions of the screw, exert pressure on the unmelted and/or half-melted resin. Accordingly, a rotational force in the direction of rotation of the screw 1 (either forward or reverse) is exerted on the screw 1 by the compressed resin remaining in grooves 6 between the flights 5 of the screw 1. Hereinafter, this rotational force is referred to as the resistance torque component. When in this state the screw 1 is advanced and injection is carried out, a rotational force component generated by a backflow of resin (hereinafter referred to as backflow torque component) is exerted on the screw 1. When a check valve closes and the backflow of resin stops the backflow torque component gradually drops to zero, and substantially the only force exerted on the screw 1 in the direction of rotation is the resistance torque component. The resistance torque component remains constant regardless of the closing of the check valve, and therefore in a screw load waveform detected during injection an offset due to the resistance torque component is added to the backflow torque component caused by the backflow of resin.

If the load (rotational force) exerted in the direction of rotation of the screw by the resin is termed the screw load, then the screw load, the backflow torque component, and the resistance torque component are related as follows:

Screw load=backflow torque component+resistance torque component

Here, the resistance torque component becomes an error in the acquisition of the backflow torque component from the screw load. In general, the backflow torque component is small, and therefore, in obtaining the backflow torque component from the detected screw load, the effect of the resistance torque component cannot be ignored.

Figure 3:
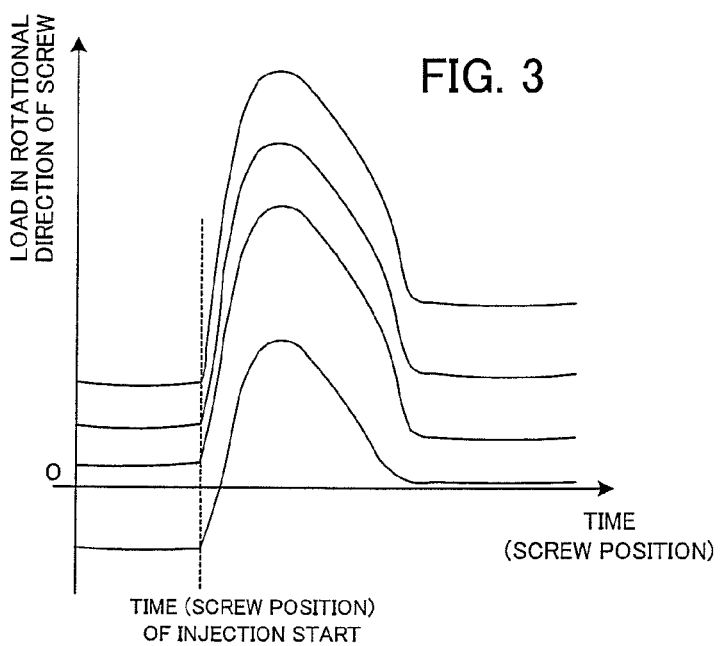
FIG. 3 is a diagram showing an example of detection of multiple screw loads and their simultaneous display as is as overlapping waveforms.

In addition, because the compression of the resin remaining in the grooves 6 after metering is finished changes at each molding cycle, the magnitude of the resistance torque component fluctuates as well. Consequently, when simultaneously displaying multiple detected screw loads as is as waveforms in an overlapping display, even though the resin backflow amount and the timing of the closing of the check valve may be stable, the waveforms do not neatly overlap due to this fluctuation in the magnitude of the resistance torque component. FIG. 3 shows an example of detecting multiple screw loads and simultaneously displaying them as is as overlapping waveforms. As shown in FIG. 3, even when the resin backflow amount and the timing of the closing of the check valve are stable and the closing of the check valve (peak load) occurs at substantially the same time (same injection screw position), because the resistance torque component fluctuates the waveforms shift up and down (in a direction of the screw load) by an amount equivalent to the resistance torque component and thus do not neatly overlap. In such circumstances, it is difficult to evaluate the reliability of check valve closure from the overlap, or lack thereof, of simultaneously displayed screw load waveforms.

For the foregoing reason, in order to evaluate the reliability of check valve closure from the simultaneous display overlapping screw load waveforms, the present invention identifies the resistance torque component contained in the screw load and removes the resistance torque component from the screw load so as to be able to detect accurately the torque component caused by the backflow of resin.

Figure 4:
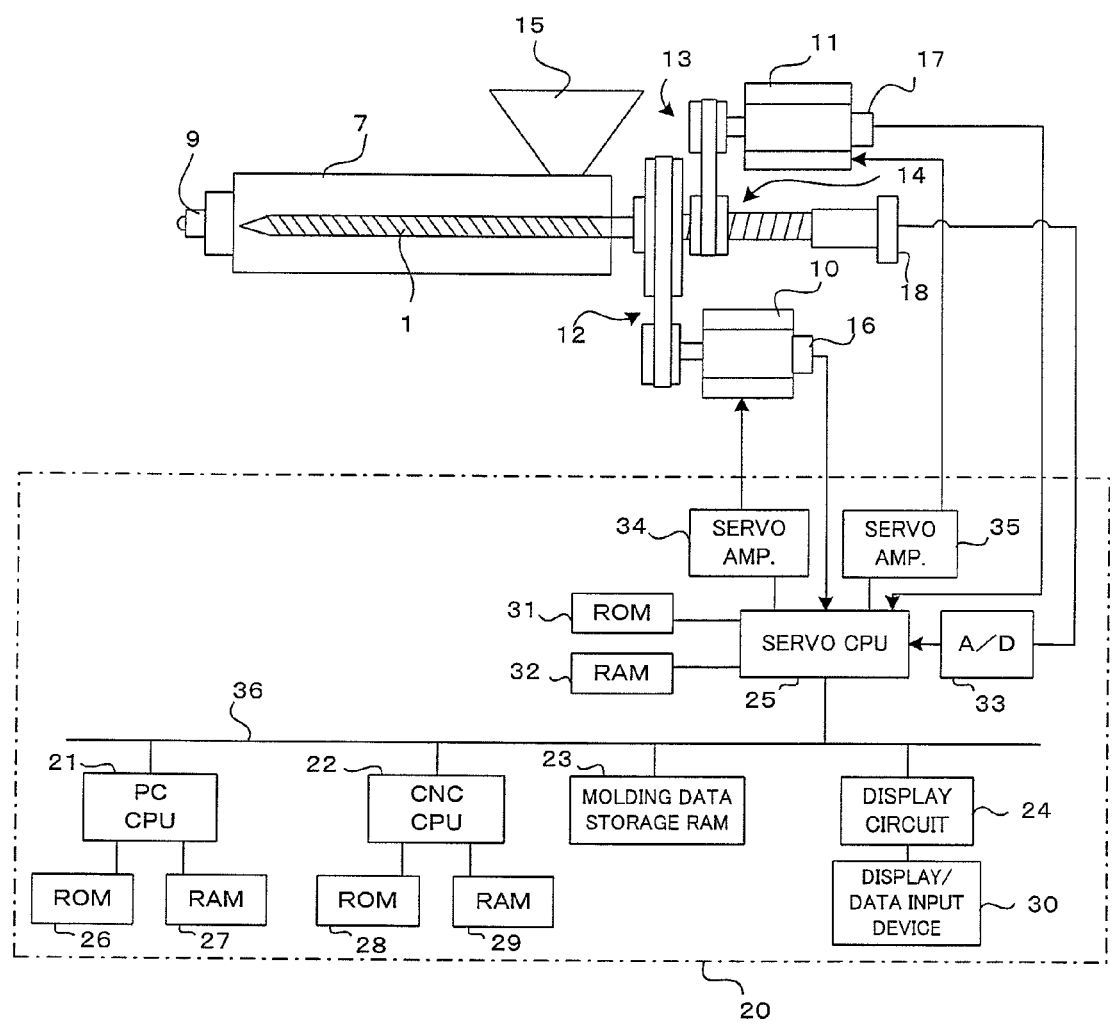
FIG. 4 is a block diagram showing essential parts of an injection molding machine according to one embodiment of the present invention.

FIG. 4 is a block diagram showing essential parts of an injection molding machine according to one embodiment of the present invention.

A nozzle 9 is attached to a front end of a barrel 7 into which the screw 1 is inserted, and a feed hopper 15 that supplies resin pellets to an interior of the barrel 7 is mounted on a rear end of the barrel 7. A check valve comprising a check ring 3 and a check seat 4 is provided at a tip of the screw 1. The screw 1 is rotationally driven by a screw rotation servo motor 10 as a rotary driving means that rotationally drives the screw 1 via a transmission unit 12. Further, an injection servo motor 11 as an axial direction driving means that drives the screw 1 in the axial direction is configured to drive the screw 1 in the axial direction and carry out injection and back pressure control via a transmission unit 13 and a ball screw/nut or other conversion mechanism 14 that converts rotary motion into linear motion. In addition, position/velocity sensors 16, 17 are mounted on the screw rotation servo motor 10 and the injection servo motor 11 to detect the rotational positions/velocities of these motors. The position/velocity detectors 16, 17 are configured to be able to detect a rotational velocity of the screw 1 and a position of the screw 1 (the screw axial direction position) as well as a movement velocity (injection velocity). Moreover, a pressure sensor 18 such as a load cell or the like that detects pressure exerted on the screw 1 from the melted resin in the axial direction is also provided.

A controller 20 that controls the injection molding machine comprises a CNC CPU 22 that is a microprocessor for numerical control, a PMC CPU 21 that is a microprocessor for programmable machine controller use, and a servo CPU 25 that is a microprocessor for servo control, all connected by a bus 36.

A controller 20 that controls the injection molding machine comprises a CNC CPU 22 that is a microprocessor for numerical control, a PMC CPU 21 that is a microprocessor for programmable machine controller use, and a servo CPU 25 that is a microprocessor for servo control, all connected by a bus 36.

To the PMC CPU 21 are connected a ROM 26 storing sequence programs and the like that control the sequence operations of the injection molding machine and a RAM 27 used for temporary storage of computational data and the like. To the CNC CPU 22 are connected a ROM 28 storing automatic operation programs and the like for overall control of the injection molding machine and a RAM 29 used for temporary storage of computational data and like.

A ROM 31, storing control programs solely for servo control that carry out position loop, velocity loop, and electrical current loop processing, and a RAM 32, used for a temporary storage of data, are connected to the servo CPU 25. Further, a servo amplifier 34 that drives the screw rotation servo motor 10 and a servo amplifier 35 that drives the injection servo motor 11 that drives the screw 1 in the axial direction and carries out injection are connected to the servo CPU 25 based on instructions from the CPU 25, and further, position/velocity detectors 16, 17 are mounted on the servo motors 10, 11 respectively, with the outputs of the position/velocity detectors 16, 17 fed back to the servo CPU 25. The servo CPU 25 issues motion commands to the axes (the screw rotation server motor 10 and the injection server motor 1) commanded from the CNC CPU 22 and carries out position and velocity feedback control based on the positions and velocities that are fed back from the position/velocity detectors 16, 17, as well as carries out electrical current feedback control and drives and controls the server motors 10, 11 through the servo amplifiers 34, 35. In addition, a current position register is also provided that obtains a position low advance of the screw 1 (screw position in the axial direction) from the position feedback signals from the position/velocity detector 17, and from such current position register the screw position can be detected.

A resin pressure (resin pressure exerted on the screw 1) converted into a digital signal by an A/D converter 33 that converts the detection signal at the pressure sensor 18 into a digital signal is input to the CPU 25.

It should be noted that servo motors, servo amps, and the like for driving a clamping unit, an ejector unit, and so forth are also provided. However, as these are not directly related to the invention of the present application, they are omitted from FIG. 4.

A date input device 30 with a display device consisting of a liquid crystal or CRT display is connected to the bus 36 via a display circuit 24. Further, a molding data storage RAM 23 consisting of a nonvolatile memory is also connected to the bus 36. A variety of molding conditions and settings, parameters, macro variables, and the like relating to the injection molding operation are stored in the molding data storage RAM 23.

Using the configuration described above, the PMC CPU 21 controls the sequence operations of the injection molding machine as a whole, the CNC CPU 22 distributes motion commands to the individual axes servo motors based on the operating programs stored in the ROM 28 and on the molding conditions stored in the molding data storage RAM 23, and the servo CPU 25, based on the motion commands distributed to the axes (the drive axes servo motors; that is, the screw rotation servo motor 10 and the injection servo motor 11) and on the feedback signals of the positions and velocities detected by the position/velocity detectors 16, 17, carries out the same servo control, such as position loop control, velocity loop control, and further, electrical current loop control, as is carried out conventionally, that is, executes so-called digital servo processing.

The above-described hardware configuration is not different from the conventional electric injection molding machine controller, the difference between the conventional controller and the present invention being that the present invention adds a function that obtains the backflow torque component. Thus, in a first embodiment of the present invention, after metering is finished but before the start of injection, the resistance torque component is measured, and, after the start of injection, the screw load is detected, and from the detected screw load the resistance torque component is subtracted to obtain the backflow torque component. Moreover, in a second embodiment of the present invention, a process of setting the resistance torque component at "0" is carried out, after which injection is carried out and the detected screw load is detected as the backflow torque.

In each embodiment, a disturbance estimating observer is provided as rotational force detection means to detect the screw load, that is, the load exerted on the screw in the direction of rotation of the screw. Particularly, the load in the direction of rotation of the screw (screw load) is obtained by the disturbance estimating observer incorporated in the drive control processing of the servo motor 10 performed by the servo CPU 25. It should be noted that, in place of the observer, alternatively the drive current for the servo motor 10 may be detected while the rotation of the servo motor 10 is stopped so as to obtain the rotational force exerted on the screw 1 based on the drive current. Further, a strain sensor may be provided on the screw 1 and the rotational force exerted on the screw 1 may be detected with the strain sensor.

Figure 5:
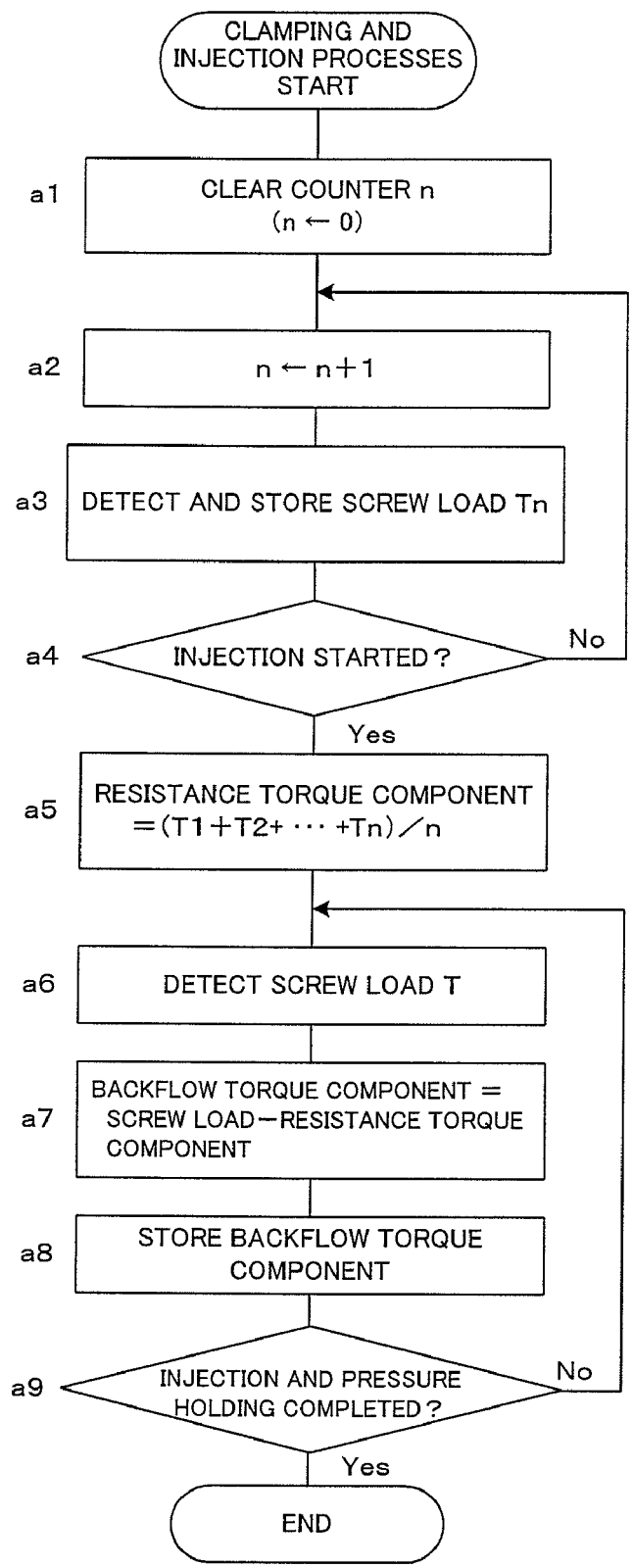
FIG. 5 is a flow chart illustrating an algorithm of a process of detecting a backflow torque component implemented by a controller of the first embodiment of the present invention.

FIG. 5 is a flow chart illustrating an algorithm of a process of detecting a backflow torque component implemented by a controller of the first embodiment of the present invention.

In the first embodiment of the present invention, when the screw rotation is stopped the resistance torque component exerted in the screw 1 is obtained and this resistance torque component is used as a reference when obtaining the backflow torque during injection.

In the interval after metering is finished but before the start of injection, no external force such as that caused by the backflow of resin is exerted on the screw 1. However, position control of the screw rotation servo motor 10 is carried out so as to hold the screw 1 at a screw rotation position in a state in which the metering process is finished. At this time, the resistance torque component from the resin in the grooves 6 exerted on the flights 5 causes the screw 1 to rotate. The screw 1 (the screw rotation servo motor 10) is controlled so as to hold that rotation position, and therefore a screw drive torque and the resistance torque component are balanced, thus enabling the resistance torque component to be identified based on the screw drive torque (screw load).

Then, in the first embodiment, after metering is finished and while the mold is being clamped, the CNC CPU 22 starts the processing shown in FIG. 5. First, a counter n is set to "0" (Step a1), and further, the counter n is incremented (Step a2), the load in the direction of rotation of the screw, that is, the screw load Tn, is detected, and stored in the RAM 29 (Step a3). This screw load, as described above, may be obtained by the disturbance observer, or, since the screw is not rotating at this time, it may be obtained as the drive current of the screw rotation servo motor 10 that rotates the screw or as the drive torque command.

It should be noted that, alternatively, the processing from Step a1 to Step a4 may be carried out in the interval between the end of metering and the start of injection, and therefore may be executed within the predetermined time period that is the interval between the end of metering and the start of injection.

Next, it is determined whether or not injection has started (Step a4). If injection has not started, procedure returns to Step a2, with processing from Step a2 to Step a4 executed at every predetermined sampling cycle.

When injection has started, the average of n screw loads stored in Step a3 is obtained and stored as the resistance torque component (Step a5). As described above, in a state in which the screw 1 is not rotating, the only rotational torque (screw load) exerted on the screw 1 is the resistance torque component. Therefore, the average value of the n screw loads detected in a state in which the screw 1 is not rotating indicates the resistance torque component.

Next, a screw load T detected by the disturbance observer is obtained (Step a6), and the resistance torque component obtained in Step a5 is subtracted from the screw load T to obtain the backflow torque component (Step a7), which is then stored in the RAM 29 (Step a8). Then, it is determined whether or not the injection and pressure holding processes have completed (Step a9). If the injection and pressure holding processes have not completed, then procedure returns to Step a6, the processing of from Step a6 to Step a9 are executed at every predetermined sampling cycle, and the backflow torque component is obtained at each sampling cycle and stored. Once the injection and pressure holding processes have completed, the process of obtaining the backflow torque component is completed.

It should be noted that storage of the backflow torque components is configured so as to recur over a plurality of molding cycles, such that, when a command to display the backflow torque components is input, waveforms of the backflow torque components stored over a plurality of molding cycles are simultaneously displayed on a display screen of the display/data input device 30 so as to overlap. Moreover, each time a new backflow torque component is obtained, that waveform is also displayed on the same display screen together with the other waveforms. This display process is the same as the conventional display process, and therefore details thereof shall be omitted herein.

In addition, since the backflow torque component and the backflow torque component waveforms indicate the resin backflow state, the backflow amount, and the timing of the closing of the check valve, by displaying the waveforms of these backflow torque components on the display screen, the resin backflow state, the backflow amount, and the timing of the closing of the check valve can be identified.

Accordingly, even if there is fluctuation in the resistance torque component, only the waveforms of the backflow torque components, which do not include the resistance torque component, are displayed, and therefore the displayed waveforms do not shift by an amount equivalent to the resistance torque component as shown in FIG. 3. Thus, when the closing of the check valve is reliably constant, the displayed waveforms overlap substantially completely (i.e., coincide). As the viscosity of the resin changes and the timing of the closing of the check valve also begins to change and shift due to changes in the temperature of the barrel 7 and the like, the waveforms of the backflow torque component begin to shift and no longer coincide. As a result, the resin backflow state, the backflow amount, and the timing of the closing of the check valve can be readily ascertained by the displayed backflow torque component waveforms, enabling the reliability of check valve closure to be evaluated from the degree to which the waveforms coincide.

It should be noted that although in this first embodiment the backflow torque component is obtained and stored in Steps a7 and a8, alternatively, instead of Steps a7 and a8, the screw load T obtained at every predetermined sampling cycle may simply be stored in Step a6 together with the resistance torque component obtained in Step a5 is stored, such that, when the backflow torque components are displayed, the backflow torque components may be obtained by subtracting the stored resistance torque components from the stored screw loads T and the results displayed.

FIG. 6 is a flow chart illustrating an algorithm of a process of detecting a backflow torque component implemented by a controller of a second embodiment of the present invention.

In the second embodiment of the present invention, prior to the start of injection the screw rotation servo motor 10 sets the rotational torque on the screw 1 at "0" and allows the screw 11 to rotate freely, such that the resistance torque component is substantially "0", in which state injection is started and the screw load detected during the injection and pressure holding processes is detected only as the backflow torque component.

When metering is completed, first, an output torque of the screw rotation servo motor 10 is set at "0" for a predetermined time period only, so that the screw 1 can rotate freely (Step b1).

In the second embodiment, this setting of the rotational torque on the screw at "0" is achieved by setting a limiting value for a torque limiting means that limits a torque command to the screw rotation servo motor 10 to the limiting value at "0" for a predetermined time period. When metering is finished, positional feedback control is carried out for the screw rotation servo motor 10 and the screw rotation servo motor 10 is held at a predetermined rotation position. The screw rotation servo motor 10 outputs torque that cancels out torque generated by the resistance torque component that tries to rotate the screw 1, the two forces are balanced, and the screw 1 is held at a predetermined rotation position. At this point, setting the limiting value for the torque limiting means at "0" for a predetermined time period causes the output torque from the screw rotation servo motor 10 to drop to "0", and the screw 1 is then rotated by the resistance torque component. At the moment in time when the resistance torque component drops to "0", the screw 1 rotation stops. Then, by returning the limiting value for the torque limiting means to its original value (a maximum value that does not limit the output torque), position feedback control is carried out and the rotation position of the screw 1 at that time is held.

It should be noted that, instead of setting the limiting value for the torque limiting means at "0" for a predetermined time period, alternatively the power that drives the screw rotation servo motor 10 may be shut off for a predetermined time period so as to allow the screw 1 to rotate freely for a predetermined time period.

After the screw 1 drive torque is set at "0" for a predetermined time period and the screw 1 is allowed to rotate freely and the resistance torque component is dropped to "0", screw position control is restarted. In this stage, by starting the position control with a position error in the position control of the control system that controls the screw rotation servo motor 10 set at "0", the screw rotation servo motor 10 does not rotate and neither does the screw 1, and further, the resistance torque component is held at "0".

When injection is started (Step b2), the load on the screw rotation servo motor 10 detected by the disturbance observer, that is, the screw load T, is obtained (Step b3), and that screw load T is stored in the RAM 29 as the backflow torque component (Step b4). Then, it is determined whether or not the injection and pressure holding processes have completed (Step b5). If not, procedure returns to Step b3, the processing of from Step b3 to Step b5 described above are executed at every predetermined sampling cycle, and the backflow torque component is obtained at every sampling cycle and stored. Once the injection and pressure holding processes have completed, the process of obtaining the backflow torque component is completed.

It should be noted that, in this second embodiment as well, storage of the backflow torque components is configured so as to recur over a plurality of molding cycles, such that, when a command to display the backflow torque components is input, waveforms of the backflow torque components stored over a plurality of molding cycles are simultaneously displayed on the display screen of the display/data input device 30 so as to overlap. In this case, the obtained screw loads are displayed as is in an overlapping display, enabling the reliability of check valve closure to be evaluated from the degree to which the waveforms coincide.

Although in the second embodiment described above the limiting value for the torque limiting means for the screw rotation servo motor 10 is set at "0", alternatively the limiting value need not be set at "0" provided that it is substantially smaller than the resistance torque component.

In the above-described embodiments the backflow torque component is obtained at every sampling cycle and stored. Alternatively, however, the screw position (the position of the screw 1 in the axial direction obtained from a value of a current value register that stores positions obtained by feedback from the position/velocity detector 17) may be obtained at every sampling cycle together with the backflow torque component and the backflow torque components displayed. In such an arrangement, based on the stored screw positions and backflow torque components, the backflow torque component for the screw position may be displayed. In this case, the screw position at which the backflow torque component peaks can be identified as the position at which the check valve closes and the resin backflow stops.

The foregoing embodiments are described using examples of detecting the backflow torque component during injection to detecting the closing of the check valve. However, the present invention is also applicable to a molding technique that adds a step of advancing the screw prior to the start of injection after completion of metering in order to close the check valve, by detecting the backflow torque component during advancing of the screw prior to injection and monitoring the closing of the check valve.

What is claimed is:

1. An injection molding machine comprising:
 a screw provided with a check valve,
 rotational drive means for driving the screw rotationally for metering of resin,
 axial drive means for driving the screw axially for injection of resin,
 rotational force determining means for determining values of a rotational force exerted on the screw,
 storing means for storing a first value of the rotational force determined by said rotational force determining means in a state in which the screw is not driven both axially and rotationally after the metering of resin has been completed; and
 calculating means for calculating a value of a rotational force exerted on the screw by backflow of resin through the check valve based on
  (i) a second value of the rotational force determined by said rotational force determining means while the screw is axially driven by said axial driving means during the injection of resin, and
  (ii) the first value of the rotational force stored by said storing means.

2. An injection molding machine according to claim 1, further comprising
 display means for simultaneously displaying, in an overlapping manner, a plurality of waveforms of rotational forces exerted on the screw by the backflow of resin, which have been calculated by said calculating means in a plurality of molding cycles.

3. An injection molding machine comprising:
 a screw provided with a check valve,
 rotational drive means for driving the screw rotationally for metering of resin,
 axial drive means for driving the screw axially for injection of resin, rotational force determining means for determining values of a rotational force exerted on the screw, means for putting the screw into a state in which the screw rotates freely, without being driven by the rotational drive means and the axial driving means, for a predetermined time period after the metering of resin has been completed and before said screw is driven in the axial direction by said axial driving means; and determining means for determining that the values of the rotational force determined by said rotational force determining means while the screw is driven in the axial direction by said axial drive means are values of a rotational force exerted on the screw by backflow of resin.

4. An injection molding machine according to claim 3, further comprising display means for simultaneously displaying, in an overlapping manner, a plurality of waveforms of rotational forces exerted on the screw by the backflow of resin, which have been determined by said determining means in a plurality of molding cycles.

* * * * *